3,756,971
BINDER FOR WET FORMING MINERAL
FIBRE BOARD
Hiroshi Watanabe and Masato Sadachi, Okayama, Yoshimitsu Nakamura, Osaka-fu, and Akira Onishi, Ashiya, Japan, assignors to Arakawa Rinsan Kagaku Kogyo Kaisha, Osaka-shi, Japan
No Drawing, Filed May 3, 1971, Ser. No. 139,814
Claims priority, application Japan, May 4, 1970, 45/38,097
Int. Cl. C08g 9/02, 51/04, 51/14
U.S. Cl. 260—17.3   7 Claims

ABSTRACT OF THE DISCLOSURE

A binder for mineral fibers comprises a water-dispersible salt of methylolated copolymer composed of 3 to 10 mole percent of at least one of acrylic acid and methacrylic acid, 40 to 77 mole percent of at least one of acrylamide and methacrylamide and 20 to 50 mole percent of at least one of acrylonitrile and methacrylonitrile.

---

The present invention relates to a binder for mineral fibers, more particularly to a binder for mineral fibers incorporating therein a specific thermosetting acrylic polymer as an effective component.

Mineral fibers such as asbestos, glass wool and the like are used as reinforcing and protective materials for various structures because of their outstanding heat retaining properties. Further especially in recent years, by using a binder these fibers are molded into platelike articles for extensive applications as ceiling materials, wall materials, etc., namely for versatile uses in which fire-resisting, heat-insulating, fire-proofing, sound-absorbing or decorative property is required.

Such mineral fiber articles are produced, for example, by adding a binder, filler, dehumidifying agent and the like to an aqueous slurry of mineral fibers, molding the slurry into a predetermined form, generally into a plate form, while simultaneously effecting dehydration and then drying the molded product for finishing. The binder used for this purpose must fulfill various requirements. For instance, it is required that the binder achieve excellent binding effects to enable the resulting product to exhibit high dry and wet strengths, do not impair fire- and heat-resisting properties which are peculiar characteristics of the product prepared from an inorganic substance, do not deteriorate water- and moisture-proof properties of the product and do not adversely affect molding procedures during production.

Generally, it has heretofore been practiced to use starch as a binder for such application, but starch fails to fully satisfy the foregoing requirements. More specifically, since starch does not have sufficient binding ability, it has to be added to mineral fibers in an amount as much as more than 15% by weight, generally 20 to 30% by weight based upon the mineral fibers, this resulting in inevitable deterioration in fire- and heat-resisting properties of the product obtained. Starch further markedly lowers drainage during molding operation, to render the molding operation troublesome or inefficient. In addition, due to the fact that starch per se is very low in waterproof property, the product incorporating starch as a binder tends to absorb water to soften and undergoes warping or bending depending upon the environment it is placed in. Further when decayed, starch may permit a growth of molds. Since starch is a natural product, the amount of starch available and cost thereof are always fluctuating and it is impossible to obtain starch of a uniform quality all the time. Notwithstanding the above-mentioned drawbacks, starch is still in use because of its inexpensiveness, and a more excellent binder serving as a substituted therefor has yet to be proposed.

Accordingly, an object of this invention is to provide an excellent binder for mineral fibers which is free of the foregoing drawbacks encountered with starch.

Another object of this invention is to provide a binder for mineral fibers which has a great binding ability for mineral fibers and which is capable of giving a mineral fiber product having high dry and wet strengths when used in a small amount, without impairing fire- and heat-resisting properties of the resulting product.

Another object of this invention is to provide a binder for mineral fibers which has excellent water- and moisture-proof properties, does not affect drainage during molding and can be easily manufactured in a great amount on industrial scale.

These and other objects and advantages of the present invention will be apparent from the following description.

The binder for mineral fibers according to the present invention comprises a water-dispersible salt of methylolated copolymer composed of (a) 3 to 10 mole percent of at least one of acrylic acid and methacrylic acid,
(b) 40 to 77 mole percent of at least one of acrylamide and methacrylamide and
(b) 20 to 50 mole percent of at least one of acrylonitrile and methacrylonitrile, said methylolated copolymer containing methylol group in the range of 1.0 to 7.5 mole percent, based on the total moles of said three monomer components composing said copolymer.

Throughout the specification and claims "water-dispersible" salt means that said salt is capable of being dissolved or emulsified in water.

The researches by the present inventors have revealed that the water-dispersible salts of methylolated copolymer comprising the three components have outstanding characteristics as a binder for mineral fibers. Put in detail, the water dispersible salts exhibit a great binding ability for mineral fibers such as asbestos, rock wool, etc. and are capable, when used in a small amount, of giving products such as a building material for ceiling, wall or the like which have high dry and wet strengths and retain heat- and fire-resisting properties inherent to the mineral fibers. Moreover, the salts per se have satisfactory water- and moisture-resisting properties and do not exert adverse effect on drainage during molding operation. Further when used in combination with starch in a specific range of mixing proportion, the salts of this invention exhibit an outstanding binding ability due to the synergic effect produced by the both materials, thus making it possible to obtain a product having high dry and wet strengths.

The water-dispersible salts of methylolated copolymer to be used as a binder in accordance with the present invention include alkali salts, such as alkali metal salts and ammonium salts. The proportions of the monomer components of the copolymer are critical and should be in the range as described before for ensuring the above excellent effects. Acrylic acid and/or methacrylic acid (hereinafter referred to as "component A") is contained in the copolymer in an amount of 3 to 10 mole percent. If the amount is less than 3 mole percent, poor water-dispersibility will result, whereas if it is in excess of 10 mole percent, the binding ability for mineral fibers will be impaired. It is preferable to use the component A in the copolymer in an amount of 4 to 7 mole percent. Acrylamide and/or methacrylic amide (hereinafter referred to as "component M") is contained in the copolymer in an amount of 40 to 77 mole percent. If this amount is less than 40 mole percent, the binding ability will decrease and it will be impossible to obtain a product of high strength, whereas if the amount exceeds 77 mole percent, the viscosity of the aqueous dispersion of the resultant salt increases and fixing of the binder on the mineral fibers is rendered poor. The component M may preferably be used in an amount of 55 to 70 mole percent. The copolymer further contains acrylonitrile and/or methacrylonitrile (hereinafter referred to as "component N") in an amount of 20 to 50 mole percent. If this amount is less than 20 mole percent, satisfactory fixing of the resulting salt on the mineral fibers will not be achieved with decrease in binding ability, while if it exceeds 50 mole percent, poor water-dispersibility will result. The copolymer may preferably contain 26 to 38 mole percent of the component N.

Methylolation of the copolymer is essential in imparting thermosetting property to the copolymer so as to enable it to exhibit a great binding ability. The methylolation is effected to such extent that the methylol group is contained in the methylolated copolymer in the range of 1.0 to 7.5 mole percent based on the total moles of the three monomer components composing the copolymer, whereby the resultant methylolated copolymer exhibits excellent binding ability with good stability during storage. If the amount of the methylol group is less than 1.0 mole percent, thermosetting property of the copolymer will be low. If it exceeds 7.5 mole percent, stability during storage will be impaired. The amount of methylol group may preferably be 2 to 6 mole percent.

The water-dispersibile salts of the methylolated copolymer to be used as a binder in this invention can be prepared in a well-known manner. For example, the components A, M and N are copolymerized in usual manner, or a copolymer of the components M and N is hydrolyzed to transform part of the component M in the copolymer into the component A to obtain a terpolymer, which is then neutralized into an alkali salt, the salt thereafter being treated with formaldehyde to methylolate the component M in the copolymer. Alternatively, the three components A, M and N are copolymerized in the presence of N-methylolacrylamide and the resulting copolymer is made into an alkali salt in like manner. Either of these methods may be adopted as desired. Further when acrylic acid or methacrylic acid in the form of alkali salt is used as the component A, the step to neutralize the copolymer with an alkali can be eliminated.

Copolymerization reaction is conducted in a usual manner as generally the case with the polymerization of acrylic monomers. For instance, monomers are dispersed or dissolved in a suitable reaction medium and the dispersion or the solution is usually heated at about 60 to 90° C. for 3 to 6 hours in the presence of polymerization initiator such as potassium persulfate, ammonium persulfate, etc. to effect polymerization. Chain transfer agents, such as allyl alcohol, may be added to the reaction system as required. In accordance with this invention, it is particularly preferable to use water as a reaction medium, whereby an aqueous dispersion of the copolymer will be obtained.

Methylolation of the copolymer is essential in imparting thermosetting property to the polymer. As already described, methylolation is achieved by conducting copolymerization reaction in the presence of N-methylolacrylamide, or by reacting formaldehyde with the copolymer obtained. In the former case there is no substantial difference in the copolymerization condition and it is desired that the polymerization system contains sodium triphosphate or the like as a pH buffer agent to prevent gelation. In the latter case, it is preferable to react formaldehyde in the presence of like buffer agent. In carrying out the reaction in this manner, it is preferable to use formaldehyde in an amount greater than is calculated for the addition of the methylol group. Presence of an unreacted formaldehyde will not cause any objectionable results such as smell or the like. It is also desired that when N-methylolacrylamide is used the amount of the component M or N be reduced in consideration of the amount of the amide. In any case, it is required that the methylolation be effected to such extent that the amount of the methylol group is in the foregoing range.

When the component A is used in the form of acid, the copolymer is finally neutralized with an alkali, while when it is used in the form of an alkali salt, neutralization can be eliminated. In either case, the resulting copolymer has to be provided with water dispersibility. Generally, neutralization is effected to an extent of 60 to 100%, preferably 70 to 90%.

Thus, the water-dispersible salt of the methylolated copolymer is generally obtained in the form of an aqueous dispersion having a solid concentration of not more than about 30% by weight, preferably 5 to 20% by weight.

In accordance with this invention, the water-dispersible salts of the methylolated copolymer exhibit outstanding effects as a binder for mineral fibers. The water-dispersible salt is used in an amount as small as about 1 to 15% by weight, preferably 2 to 10% by weight, based on the weight of the mineral fibers, whereby a molded article is obtained which has much higher mechanical strength than conventional products incorporating starch as a binder. The molded article obtained has remarkably improved properties than conventional products prepared by using starch as a binder, with respect to any of heat resistance, fire resistance, water-proofness and moisture-proofness. The salts of this invention further ensure satisfactory drainage during molding and permit easy molding procedure. In addition, the water-dispersible salts of methylolated copolymer can be mixed with starch for use in combination therewith in a wide proportion range of 9:1 to 1:9 by weight. Especially when a binder mixture of the salt and the starch in the proportion range of 5:5 to 1:9 is used, both exert a remarkable synergic effect to result in a product having materially improved dry and wet strengths. The most outstanding synergic effect is attained when the proportion of the former to the latter is 2.5:7.5. Presumably this may be due to the fact that the starch and the water-dispersible salt produce cross linking during heat-drying step, whereby a water-resisting and strong three-dimensional bond is formed. Thus, the water-dispersible salts of the methylolated copolymer are considered to be of an ability to serve as a water-proofing agent for starch, whereas only poor results are achieved when urea-formaldehyde resin or ketone-formaldehyde resin, known as a water-proofing agent for starch in the paper-making industry, is mixed with starch and used as a binder for mineral fibers. From this, it is believed that the water-dispersible salts of methylolated copolymer of this invention have a fixing ability and coagulating effect for mineral fibers.

The binder is used in the same manner as conventional starch binder. For example, the binder is added to an aqueous slurry of mineral fibers such as asbestos, rock wool or the like. When desired, an acidic or neutral deposition promoting agent such as aluminum sulfate, dehumidifying agent such as wax, rosin or petroleum resin sizing agent and a filler such as talc, clay or the like may be added to the slurry. The slurry is then pressed in a predetermined form such as in the form of plate for molding while being dehydrated, the molded product thereafter being dried by heating. This procedure is well known as wet felting process, and such process already known may be used. It is also possible to use the present binder in accordance with paste process which is known as a process for producing mineral fiber products of this type.

For better understanding of this invention, examples of this invention and a comparison example will be given below. The parts and percentages referred to therein are all by weight.

EXAMPLE 1

In 2000 parts of water were dissolved 5 parts of sodium acrylate, 632 parts of acrylamide and 218 parts of acrylonitrile (molar ratio of 5:65:30) along with 4.5 parts of allyl alcohol serving as a chain transfer agent. The resulting solution and 100 parts of a 4.5% aqueous solution of potassium persulfate separately prepared were placed dropwise into a reactor to effect reaction at 80 to 85° C. for 4 hours with stirring. After completion of polymerization, 50.7 parts of sodium triphosphate and 64.2 parts of 35% formalin were added to the reaction system to effect further reaction at 50 to 60° C. for 2 hours. This gave a uniform slightly yellow aqueous dispersion having a concentration of 15%, a viscosity of 5000 cps. and a pH of 7.5.

The aqueous dispersion of copolymer thus prepared was used as a binder to produce a rock wool plate. Rock wool was uniformly suspended in water to prepare a slurry, to which clay was added in an amount of 6% based on the weight of the rock wool, and the mixture was thoroughly stirred. Then a wax emulsion and the aqueous dispersion of sodium salt of the methylolated copolymer obtained in the foregoing step were added to the resulting slurry in a solid weight of 1.0% and 3.0% respectively, based on the weight of the rock wool, and further aluminum sulfate was added thereto in an amount of 2.0% based on the weight of the rock wool, whereby molding composition was prepared. The molding material was then placed into a box having a bottom of a 16-mesh metal screen for filtration. The resulting cake was cold-pressed for 30 seconds under a pressure of 1 kg./cm.$^2$ and then dried in a hot air at 150° C. for 3 hours to give a plate having a thickness of 12.0±0.3 mm. and a specific gravity of 0.38±0.01, which was thereafter left to stand overnight in a constant temperature and humidity chamber.

EXAMPLE 2

In 2000 parts of water were dissolved 5 parts of sodium acrylate, 492 parts of acrylamide, 294 parts of acrylonitrile and 6.6 parts of N-methylolacrylamide (molar ratio of 5:50:40:5) along with 152 parts of sodium triphosphate and 9 parts of allyl alcohol. The resulting solution and 100 parts of a 4.5% aqueous solution of potassium persulfate separately prepared were placed dropwise into a reactor to effect reaction at 80 to 85° C. for 4 hours with stirring. After completion of polymerization, the reaction system was diluted with water to obtain a uniform slightly yellow aqueous dispersion having a concentration of 15%, a viscosity of 7500 cps. and a pH of 7.8.

In the same manner as in Example 1 the aqueous dispersion of copolymer thus prepared was used as a binder to produce a molding composition, from which a rock wool plate was prepared in the same manner as described in Example 1.

EXAMPLE 3

A rock wool plate was prepared in the same manner as in Example 1 except that the sodium salt of the methylolated copolymer obtained in Example 1 and an aqueous solution of corn starch were added to a slurry of rock wool in a solid weight of 1% and 6% respectively, based on the weight of the rock wool to produce a molding composition.

EXAMPLE 4

A rock wool plate was prepared in the same manner as in Example 1 except that the sodium salt of the methylolated copolymer obtained in Example 1 and an aqueous solution of corn starch were added to a slurry of rock wool in a solid weight of 1.5% and 4.5% respectively, based on the weight of the rock wool to produce a molding composition.

COMPARISON EXAMPLE

A rock wool plate was prepared in the same manner as in Example 1 except that corn starch was added as a binder of the conventional type to a slurry of rock wool in a solid weight of 1% based on the rock wool to prepare molding composition.

Tests were conducted to determine drainage of the molding composition and the properties of the rock wool plates obtained in Examples 1 to 4 and comparison example with the results given in Table 1.

Testing methods (1) Drainage.—Each molding composition was fed to a TAPPI standard sheet machine and the composition was diluted with water to produce 7 liters of slurry containing 2.5% rock wool. The diluted slurry was passed through a 16-mesh metal screen to measure the time required for drainage.

(2) Bending strength.—Bending strength of the rock wool plates was determined in accordance with JIS A–5905 (1970).

(3) Wet bending strength.—Rock wool plates were left to stand for 3 days in a constant temperature and humidity chamber of 20° C. and 95% RH and thereafter wet bending strength was determined according to JIS A–5905 (1970).

(4) Water absorption degree.—Water absorption degree was determined in accordance with JIS A–5905 (1970) on the rock wool plates immersed in water for 2 hours.

(5) Water resistance test.—Base material test and surface test were conducted in accordance with JIS A–1321 (1970).

TABLE 1

| Binder | Drainage (sec.) | Bending strength (kg./cm.$^2$) | | Water absorption degree (g./cm.$^2$) | Fire resistance test | |
|---|---|---|---|---|---|---|
| | | Dry | Wet | | Base material test | Surface test |
| Example 1 | 9 | 28.9 | 14.2 | 0.018 | Temperature in furnace 30° C. up. | 20° C. below standard temperature curve. |
| Example 2 | 10 | 28.5 | 14.8 | 0.020 | Temperature in furnace 35° C. up. | Do. |
| Example 3 | 19 | 41.8 | 21.4 | 0.023 | Temperature in furnace 45° C. up. | 10° C. below standard temperature curve. |
| Example 4 | 16 | 40.0 | 20.2 | 0.021 | Temperature in furnace 39° C. up. | 13° C. below standard temperature curve. |
| Comp. ex | 26 | 26.3 | 9.0 | 0.146 | Temperature in furnace 120° C. up. | 40° C. above standard temperature curve. |

It will be apparent from the results above that use of a small amount of the binding agent of this invention achieves an outstanding result without exerting an adverse effect on the molding procedure over the use of conventional binder. The mineral fiber product obtained by using the present binder has an excellent dry strength, especially high wet strength, satisfactory water- and fire-resistance and is completely free from coloring due to heat-drying and occurrence of molds due to decaying of binder. Further the use of an alkali salt of methylolated copolymer in combination with starch exhibits surprising bonding strength, this being achieved with use of not more than half the amount of starch conventional required, with further advantage that the characteristics of the resultant product as an inorganic substance can be fully ensured.

What we claim is:

1. A binder for mineral fibers comprising a water-dispersible salt of methylolated copolymer composed of
   (a) 3 to 10 mole percent of at least one of acrylic acid and methacrylic acid,
   (b) 40 to 77 mole percent of at least one of acrylamide and methacrylamide and
   (c) 20 to 50 mole percent of at least one of acrylonitrile and methacylonitrile, said methylolated copolymer containing methylol group in the range of 1.0 to 7.5 mole percent, based on the total moles of said three monomer components composing said copolymer.

2. A binder for mineral fibers according to claim 1 in which said methylolated copolymer is composed of
   (a) 4 to 7 mole percent of at least one of acrylic acid and methacrylic acid,
   (b) 55 to 70 mole percent of at least one of acrylamide and methacrylamide and
   (c) 26 to 38 mole percent of at least one of acrylonitrile and methacrylonitrile.

3. A binder for mineral fibers according to claim 1 in which said methylolated copolymer contains methylol group in the range of 2 to 6 mole percent, based on the total moles of said three monomer components composing said copolymer.

4. A binder for mineral fibers according to claim 1 in which said water-dispersible salt of methylolated copolymer is mixed with starch in a weight ratio of said salt to said starch of 9:1: to 1:9.

5. A binder for mineral fibers according to claim 4 in which said weight ratio is in the range of 5:5 to 1:9.

6. A binder for mineral fibers according to claim 5 in which said weight ratio is in the range of 2.5:7.5.

7. A method for producing a molded mineral fiber product which comprises adding the binder specified in claim 6 to an aqueous slurry of a mineral fiber to produce a molding composition, molding the composition into a desired shape and drying the molded material, said binder containing 1–15% by weight of said water-dispersible salt of methylolated copolymer based on the weight of the mineral fibers.

References Cited

UNITED STATES PATENTS 3,037,963  6/1962  Christenson _____ 260—72 R
3,072,595  1/1963  Barth _____ 260—39 R WILLIAM H. SHORT, Primary Examiner E. WOODBERRY, Assistant Examiner U.S. Cl. X.R.

260—39 A, 72 R, 80.8; 264—122